United States Patent
Herrmann et al.

(10) Patent No.: US 10,738,748 B2
(45) Date of Patent: Aug. 11, 2020

(54) VALVE FOR METERING A FLUID

(71) Applicant: Robert Bosch GmbH, Stuttgart (DE)

(72) Inventors: Nico Herrmann, Rastatt (DE); Andreas Schaad, Maulbronn (DE); Joerg Abel, Gerlingen (DE); Juergen Maier, Ottmarsheim (DE); Martin Buehner, Backnang (DE); Matthias Boee, Ludwigsburg (DE); Olaf Schoenrock, Schwieberdingen (DE); Philipp Rogler, Wiernsheim (DE); Stefan Cerny, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 63 days.

(21) Appl. No.: 16/311,354

(22) PCT Filed: Jun. 21, 2017

(86) PCT No.: PCT/EP2017/065233
§ 371 (c)(1),
(2) Date: Dec. 19, 2018

(87) PCT Pub. No.: WO2018/001824
PCT Pub. Date: Jan. 4, 2018

(65) Prior Publication Data
US 2019/0234358 A1 Aug. 1, 2019

(30) Foreign Application Priority Data

Jun. 30, 2016 (DE) .......... 10 2016 211 904
Apr. 28, 2017 (DE) .......... 10 2017 207 270

(51) Int. Cl.
| | |
|---|---|
| *F02M 51/06* | (2006.01) |
| *F02M 63/00* | (2006.01) |
| *F02M 61/04* | (2006.01) |
| *F16K 31/06* | (2006.01) |
| *B05B 1/30* | (2006.01) |

(52) U.S. Cl.
CPC ......... *F02M 51/0653* (2013.01); *B05B 1/302* (2013.01); *F02M 51/0625* (2013.01);
(Continued)

(58) Field of Classification Search
CPC ........... F02M 51/0625; F02M 51/0653; F02M 51/066; F02M 51/0685; F02M 61/042;
(Continued)

(56) References Cited

U.S. PATENT DOCUMENTS

| | | | | |
|---|---|---|---|---|
| 6,367,769 B1 * | 4/2002 | Reiter | ................ | F02M 51/0671 |
| | | | | 251/129.19 |
| 6,520,434 B1 * | 2/2003 | Reiter | ................ | F02M 51/0685 |
| | | | | 239/585.5 |

(Continued)

FOREIGN PATENT DOCUMENTS

| | | |
|---|---|---|
| DE | 102004037250 A1 | 2/2006 |
| IE | 10345967 A1 | 4/2005 |

(Continued)

OTHER PUBLICATIONS

International Search Report dated Oct. 4, 2017 of the corresponding International Application PCT/EP2017/065233 filed Jun. 21, 2017.

*Primary Examiner* — Darren W Gorman
(74) *Attorney, Agent, or Firm* — Norton Rose Fulbright US LLP; Gerard Messina

(57) ABSTRACT

A fluid metering valve includes a valve needle that is actuatable by an electromagnetic actuator that includes an armature guided on and along a longitudinal axis of the valve needle with a movement limited by a stop surface on the valve needle. A projection of an edge of the stop surface extends into a projection plane, perpendicular to the longitudinal axis and at which the armature and stop surface are in contact temporarily during operation, through an opening of a conduit of the armature, dividing the opening into an (Continued)

inner surface on one side of the projection and an outer surface on the other side of the projection. A fluid exchange between inside and outside of an area between the stop surface and armature is via a path through the inner surface, conduit, and outer surface when the armature is in contact with the stop surface at the projection plane.

15 Claims, 7 Drawing Sheets

(52) U.S. Cl.
CPC ...... *F02M 51/0685* (2013.01); *F02M 61/042* (2013.01); *F02M 63/0022* (2013.01); *F02M 63/0075* (2013.01); *F16K 31/0651* (2013.01); *F16K 31/0696* (2013.01); *F02M 2200/304* (2013.01)

(58) Field of Classification Search
CPC ........... F02M 63/0022; F02M 63/0075; F02M 2200/304; F16K 31/0651; F16K 31/0696
See application file for complete search history.

(56) References Cited

U.S. PATENT DOCUMENTS

| | | | |
|---|---|---|---|
| 6,742,726 B2* | 6/2004 | Reiter | F02M 51/0685 |
| | | | 239/533.2 |
| 6,799,734 B1* | 10/2004 | Hans | F02M 61/12 |
| | | | 239/585.1 |
| 6,808,134 B2* | 10/2004 | Noller | F02M 51/0671 |
| | | | 239/533.2 |
| 7,007,870 B2* | 3/2006 | Noller | F02M 51/0685 |
| | | | 239/585.5 |
| 2015/0247479 A1* | 9/2015 | Maeurer | F02M 51/066 |
| | | | 239/585.2 |
| 2016/0293311 A1* | 10/2016 | Cerny | F02M 51/0685 |

FOREIGN PATENT DOCUMENTS

| | | |
|---|---|---|
| JP | 2015108409 A | 6/2015 |
| WO | 02/068811 A1 | 9/2002 |
| WO | 2014/048609 A1 | 4/2014 |

\* cited by examiner

VALVE FOR METERING A FLUID

CROSS-REFERENCE TO RELATED APPLICATIONS

The present application is the national stage of International Pat. App. No. PCT/EP2017/065233 filed Jun. 21, 2017, and claims priority under 35 U.S.C. § 119 to DE 10 2016 211 904.4, filed in the Federal Republic of Germany on Jun. 30, 2016 and to DE 10 2017 207 270.9, filed in the Federal Republic of Germany on Apr. 28, 2017, the content of each of which are incorporated herein by reference in their entireties.

FIELD OF THE INVENTION

The present invention relates to a valve for metering a fluid, e.g., a fuel injection valve for internal combustion engines. The invention relates especially to the field of injectors for fuel injection systems of motor vehicles in which a direct injection of fuel into combustion chambers of an internal combustion engine occurs.

BACKGROUND

DE 103 45 967 A1 discloses a fuel injection valve for fuel injection systems of internal combustion engines. The known fuel injection valve encompasses a solenoid and an armature pushable by the solenoid in a stroke direction against a return spring. The armature is disposed movably on the valve needle between a first flange that is connected to the valve needle and delimits the motion of the armature in the stroke direction, and a second flange connected to the valve needle. Provided between the armature and the second flange is a spring by which the armature is pushed, with the fuel injection valve in an idle state, in such a way that is spaced away from a stop surface of the second flange with formation of an armature travel distance. It has already been disclosed in this context that the use of a spring embodied as a helical spring, instead of a cup string, is advantageous because a cup spring prevents equalization of the fuel present between the armature, armature stop, and spring, with the result that buildups and uncontrolled hydraulic behavior of the fuel in the region of the armature can occur.

SUMMARY

Example embodiments of the present invention provide a valve with an advantage that an improved configuration and manner of operation are made possible. In particular, dynamic behavior upon opening and closing of the valve can be improved. Undesired hydraulic effects such as hydraulic sticking, and/or undesired mechanical effects such as armature bounce, can especially be avoided or at least reduced.

The armature is preferably disposed in an interior space of the valve which is filled with a liquid fluid at least during operation. In a preferred embodiment, that liquid fluid is the fluid that is metered by the valve. In an embodiment of the valve as a fuel injection valve, it can thus be liquid fuel.

With such an embodiment, when a flat end face of the armature comes into planar abutment with a flat stop surface in the initial state or also during an actuation cycle, as is the case with a conventional embodiment, a hydraulic sticking effect then occurs upon release of the armature from the stop surface, as a result of the hydraulic medium, i.e., the liquid fluid. That effect is caused in particular by the fact that the liquid fluid must first flow into the narrow gap that is being produced. Conversely, with a conventional embodiment, hydraulic damping occurs as the armature approaches the stop surface, since the liquid fluid is to be displaced out of the gap as it becomes increasingly narrow. In one actuation cycle, these two effects occur alternately at the respective stop surfaces. This results in a damping effect and in particular a delay in terms of the dynamics of control application to the valve. On the other hand, armature bounce upon closing is thereby reduced with the conventional embodiment.

With the proposed valve, which is correspondingly refined as applicable, the coverage of one or several passthrough conduits of the armature, and a stiffness of the one or both stops for the armature, can be optimized in such a way that an optimal combination of hydraulic damping upon closing of the valve, and minimal hydraulic sticking of the armature at the relevant stop surface upon opening, are achieved with reference to the particular embodiment of the valve.

The stop surface has an outer edge that extends once around the longitudinal axis of the valve needle. In principle, a passthrough opening, in particular a passthrough orifice, can also be configured on the stop element on which the stop surface is embodied, with the result that an edge located inside the stop surface, in particular a circular edge, can be formed. Depending on the placement, configuration, and number of the passthrough conduits, the stop surface can be embodied suitably to enable the fluid to flow through via the individual passthrough conduits.

For example, several passthrough conduits can be provided, of which some are disposed closer to the longitudinal axis of the valve needle and others farther from the longitudinal axis of the valve needle. If the relevant stop surface is to be embodied to be correspondingly large, the proposed solution can then be implemented both for the passthrough conduits located farther inward and for those located farther outward. For the passthrough conduits located farther inward, inwardly located passthrough openings having corresponding inwardly located edges can in particular be implemented in order to ensure the stability of the stop surface. Tin an example embodiment, the disposition of the at least one relevant passthrough conduit, in particular its distance from the longitudinal axis, and the dimensioning of the stop surface, in particular a radius of the edge of the stop surface with respect to the longitudinal axis, can be coordinated with one another in such a way that the proposed solution can be realized without associated passthrough openings on the stop element on which the stop surface is configured.

In an example embodiment, the stop surface is configured, as a whole or in one or several parts, as an enveloping surface of a body that tapers along the longitudinal axis. It can be provided that a contact occurs between the armature and the stop surface at the outer edge when the stop element on which the stop surface is configured is mechanically stress-free. That abutment is then of course interrupted in the region of the at least one passthrough conduit. In an example embodiment, the body that tapers along the longitudinal axis is based on a cone or truncated cone.

In an example embodiment, the stop surface in a stress-free state abuts only at its edge against the armature when the armature and the stop surface are in contact during operation. An advantageous abutment can be achieved in a mechanically stress-free state of the stop element on which the stop surface is embodied, the abutment of course being interrupted in the region of the at least one passthrough conduit.

Embodiments are thus possible in which an open partial space is constituted in particular between the armature and the stop surface when the stop element is mechanically stress-free. This partial space of the interior space in which the armature is disposed is open toward the remainder of the interior space via the passthrough conduit, enabling a relevant exchange of fluid and pressure.

Advantageously, the relevant stop surface is embodied on a stop element. In an example embodiment, a stop element connected to the valve needle or configured on the valve needle is provided, on which element the stop surface is configured. During operation, as a result of a dynamic deformation of the stop element that is enabled by stoppage of the armature against the stop surface, the stop surface, along with an edge region adjoining at the edge of the stop surface, temporarily partly and/or temporarily completely interrupts fluid exchange through the inner partial surface. It is understood that two stop elements can also be provided here, of which, for example, one is configured on the valve needle and the other is connected to the valve needle in order to fit a one-piece armature, having a central passthrough orifice, onto the valve needle and then to limit its motion between the stop elements. A configuration having two stop elements configured on the valve needle is also possible, however, for example if a segmented armature is utilized. The proposed configuration of the stop surface can furthermore be implemented on only one of the stop surfaces, in the same manner on both stop surfaces, or differently on both stop surfaces. Adaptations to the respective application, in particular the desired valve dynamics and the required bounce behavior upon closing of the valve, are thereby possible. In particular, it can be advantageous to largely avoid bounce in order to achieve a desired multiple injection capability, for which several injection events during one injection cycle must be implementable.

In an example embodiment, during operation, an interstice always remains between the stop element and an end surface, facing toward the stop element, of the armature. In an example embodiment, the stop element and an end surface of the armature facing toward the stop element are structured such that, during operation, an interstice adjoining the valve needle and/or configured at least approximately rotationally symmetrically with reference to the longitudinal axis of the valve needle always remains between the stop element and the end surface facing toward the stop element of the armature. According to these embodiments, an overpressure in the interstice as the armature stops against the stop element, or a negative pressure in the interstice as the armature bounces back, can advantageously be generated, thereby resulting in a particularly effective reduction in possible bouncing of the armature. Rapid stabilization of the armature in terms of its initial position with a closed valve can thereby be achieved in particular, in order to achieve a multiple injection capability even with short off times between the individual injection events in an injection cycle.

In an example embodiment, a surface delimiting the interstice, that is perpendicular to the longitudinal axis, and that delimits the interstice is configured on the stop element, and a step is configured between the surface and the stop surface. In particular, the surface that is configured on the stop element and delimits the interstice can be configured here as an annular surface. In an example embodiment, outside such an annular surface when considered radially, a stop surface that is configured as an enveloping surface of a truncated cone can be configured on the stop element, the proposed step being provided between the annular surface and that stop surface. It is thereby possible, inter alia, in the context of process control or quality control, for a particularly advantageous and exact measurement of the opening angle of the truncated cone or of the implemented bevel to be accomplished. For example, it is possible to predefine for the stop surface an inclination that results in a height difference of 5 μm when viewed along the longitudinal axis. A tolerance range that is equal to plus/minus 5 μm can be predefined for implementation in the context of series production, such that a non-negligible height always remains in the context of the solutions proposed here (excluding a degeneration of the truncated cone down to an opening angle of 180°). The annular surface that is implemented makes possible here an advantageous reference point for measurement, since it corresponds more or less to an opening angle of 180°. On the one hand, a defined transition into the stop surface is achieved by way of the step. On the other hand, the volume of the interstice is predefined by the step or by the height of the step considered along the longitudinal axis. Coordination with the particular application instance can also be effected thereby by selecting a suitable height for the step.

In an example embodiment, the surface that delimits the interstice and is preferably configured annularly can also be adjoined by a stop surface that is located in the projection plane and is likewise preferably configured annularly. The preferably annular surface and the preferably annular stop surface can thus be oriented parallel to each other, the step, having a height considered along the longitudinal axis, being provided between them. With this embodiment (but not limited to this embodiment), in the context of the proposed solutions an inclination is then implemented, in profile, on that end surface of the armature which faces toward the stop surface, in the relevant region in which mutual contact occurs at the projection plane in the idle state. In particular, the end surface of the armature can be configured to correspond to an enveloping surface of a truncated cone.

In an example embodiment, an end surface of the armature facing toward the stop surface lies in the projection plane when the armature and the stop surface are in contact at the projection plane during operation. In an example embodiment, the stop surface lies in the projection plane when the armature and the stop surface are in contact at the projection plane during operation. The end face of the armature that faces toward the stop surface can be configured to be flat and oriented perpendicularly to the longitudinal axis of the valve needle. This is advantageous in particular in combination with an at least partly conical stop surface.

In an example embodiment, the stop surface and the passthrough conduit are configured so that the inner partial surface is no larger than the outer partial surface. This can have an advantage that, on the one hand, a throttling effect with reference to the internal partial surface can optionally be achieved, while on the other hand, a flow through the flow-through conduit, in order to accelerate the armature, is not too greatly throttled by a correspondingly large outer partial surface specifically upon release of the armature from the stop surface. In particular, in order to coordinate the dynamic behavior and/or to avoid bounce, the internal partial surface can also optionally be selected to be small in order to generate a corresponding hydraulic throttling effect, while an outer partial surface that is as large as possible allows flow to occur through the armature in the desired manner.

Preferred example embodiments of the invention are explained in further detail in the description below with reference to the appended drawings, in which corresponding elements are labeled with matching reference characters.

DETAILED DESCRIPTION

Figure 1:
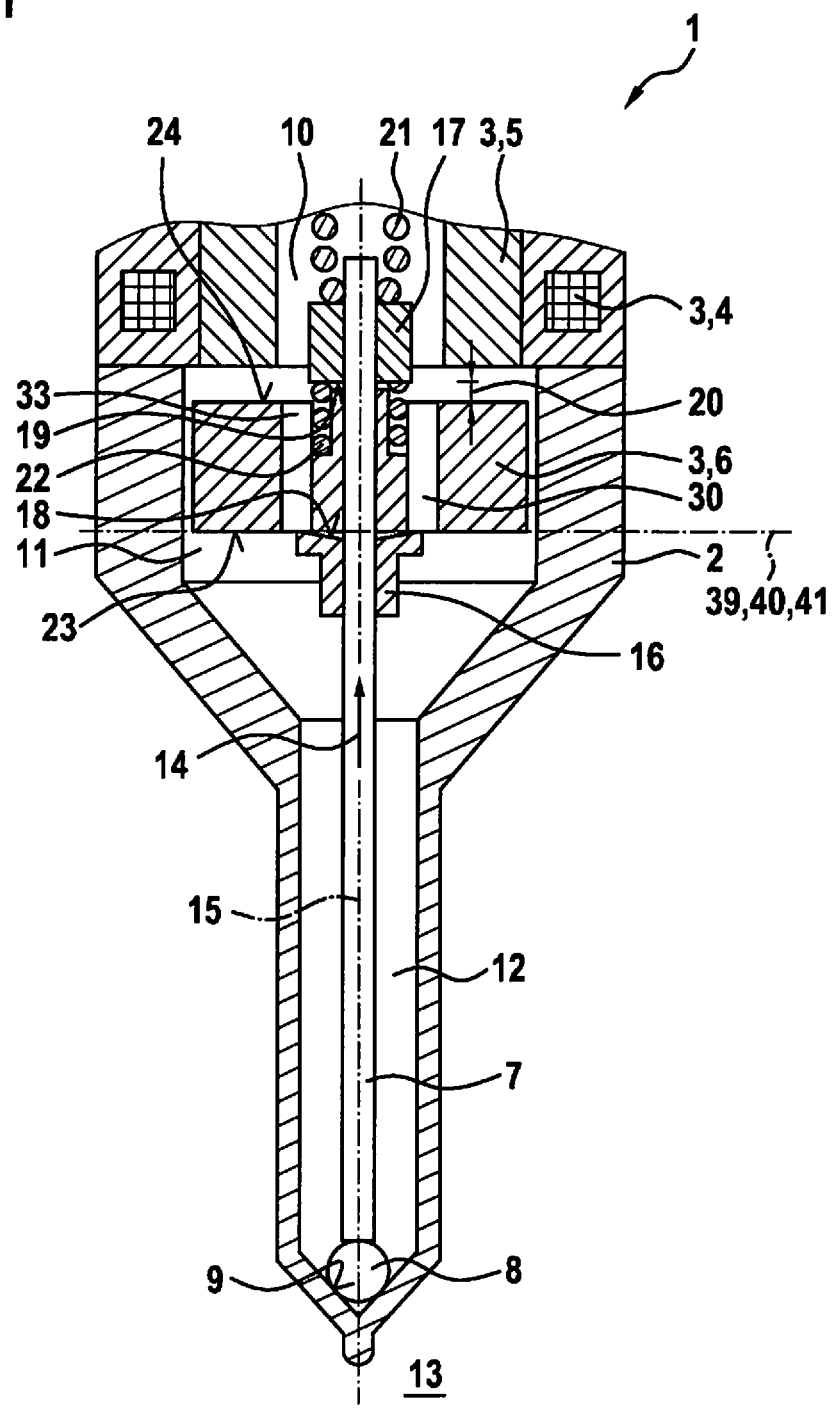
FIG. 1 is a partial schematic sectioned depiction of a valve in accordance according to an example embodiment of the present invention.

FIG. 1 is a partial schematic sectioned depiction of a valve 1 for metering a fluid, in accordance with an example embodiment. Valve 1 can be embodied in particular as a fuel injection valve 1.

A preferred application instance is a fuel injection system in which such fuel injection valves 1 are embodied as high-pressure injection valves 1 and serve for direct injection of fuel into associated combustion chambers of the internal combustion engine. Liquid or gaseous fuels can be utilized as a fuel.

Valve 1 has a multi-part valve housing 2; an electromagnetic actuator 3 that encompasses a solenoid 4, an internal pole 5, and an armature 6; and a valve needle 7 that is actuatable by electromagnetic actuator 3 and that, during operation, actuates a valve closing body 8 connected to valve needle 7 in order to open a sealing seat constituted between valve closing body 8 and a valve seat surface 9. In that context, fuel is guided via an axial orifice 10 of inner pole 5 into an interior space 11 of valve housing 2, and out of interior space 11 via an annular gap 12 to the sealing seat, so that when the sealing seat is open, fuel can be injected via nozzle openings into a space 13, in particular a combustion chamber 13.

In this example embodiment, valve 1 is embodied as an inward-opening valve 1, valve needle 7 being shifted in an opening direction 14 along a longitudinal axis 15 in order to open valve 1.

Armature 6 of actuator 3 is mounted floatingly on valve needle 7, so that a motion of armature 6 along longitudinal axis 15, in and oppositely to opening direction 14, is possible. That motion is limited with respect to valve needle 7 by stop elements 16, 17. Stop elements 16, 17 can respectively be connected to valve needle 7 or can be configured on valve needle 7. In this example embodiment, stop element 16 is embodied as a stop sleeve 16 that is fixedly connected to valve needle 7. Furthermore, in this example embodiment stop, element 17 is embodied as a stop ring 17 that is likewise fixedly connected to valve needle 7. Fixed connections of this kind can be implemented, for instance, by welding. Embodied on stop elements 16, 17 are stop surfaces 18, 19 that face toward each other and between which armature 6 is shiftable in accordance with a predefined armature travel distance 20.

Also provided is a return spring 21 that, in this example embodiment, pushes valve needle 7 oppositely to opening direction 14 by way of stop element 17, in order to shift valve needle 7 into its initial position in which the sealing seat is closed. Also provided is a spring 22 that pushes armature 6 into its initial position in which armature 6 abuts with its end surface 23 against stop surface 18. In this initial position, armature travel distance 20 exists between end surface 24 of armature 6 which faces away from end surface 23, and stop surface 19.

Upon an actuation of valve 1, a current flow occurs through solenoid 4 so that armature 6 becomes accelerated in opening direction 14 as a result of the magnetic force that is acting. Valve needle 7 remains in its initial position until armature 6 strikes with its end surface 24 against stop surface 19 of stop element 17. The acceleration of armature 6 enables a greater opening momentum for displacing valve needle 7. The motion of armature 6 is then limited relative to valve housing 2 by coming to a stop against inner pole 5. A certain follow-through of valve needle 7 can still occur.

In order to close valve 1, solenoid 4 is switched to zero current so that a return of valve 7 oppositely to opening direction 14 occurs by way of return spring 21, armature 6 being entrained by way of stop element 17. When valve closure body 8 drops into its seat, the further return of armature 6 into the initial position depicted in FIG. 1 then occurs, in which context spring 22 ensures the initial position.

In this example embodiment, interior space 11 is filled with liquid fuel. Flow-through conduits 30-35 embodied in armature 6 enable fuel to be conveyed out of orifice 10 toward annular gap 12. Fuel can also flow past armature 6 between armature 6 and valve housing 2.

In an actuation operation, liquid fuel is firstly forced between end face 24 of armature 6 and stop surface 19 of stop element 7. A release of armature 6 at its end surface 24 from stop surface 19 of stop element 17 must then occur. A forcing of the liquid fuel between stop surface 18 of stop element 16 and end surface 23 of armature furthermore occurs upon closure of valve 1. Also particularly advantageous, at the beginning of the actuation operation, armature 6 is released from stop element 16, upon which liquid fuel flows in between end surface 23 of armature 6 and stop surface 18 of stop element 16. A particular configuration on stop surface 18 of stop element 16 and/or on stop surface 19 of stop element 17 is proposed in order to ensure advantageous hydraulic behavior. It is understood in this context that the configuration described below with reference to stop element 16 and armature 6 can also be implemented, alternatively or additionally, with reference to stop element 17.

Figure 2:
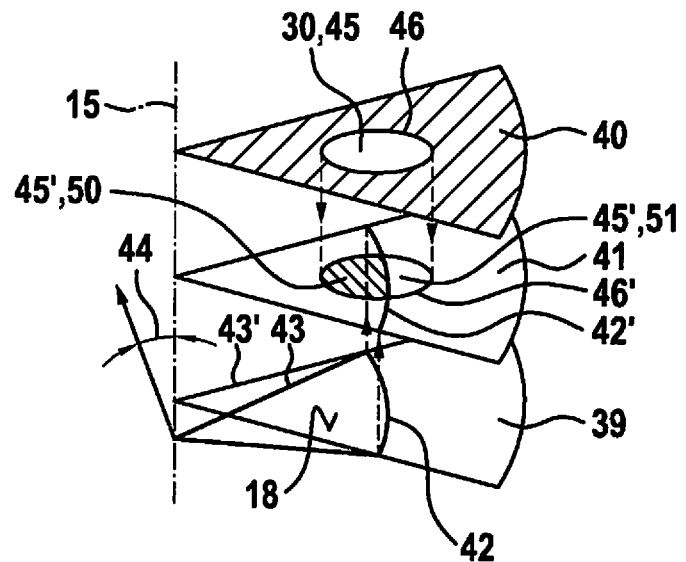
FIG. 2 is a partial schematic depiction to explain the configuration of the valve shown in FIG. 1 in an exploded view, according to an example embodiment of the present invention.

FIG. 2 is a partial schematic depiction to explain the configuration of valve 1 shown in FIG. 1, in an exploded view. To simplify the depiction, only a longitudinal axis 15 of valve needle 7 is depicted in order to illustrate the location of valve needle 7. Also depicted are planes 39, 40, 41 that are each penetrated perpendicularly by longitudinal axis 15. Planes 39 to 41 are each represented here by a pie-shaped portion of a circle whose center point lies on longitudinal axis 15. Plane 41 is the projection plane at which stop element 16 and armature 6 are in contact when valve 1 is in a suitable position. Plane 40 is characterized in that end surface 23 of armature 6 lies in it. The configuration of armature 6 is not, however, necessarily limited to the fact that end surface 23 of armature 6 lies in plane 40 and is thus penetrated perpendicularly by longitudinal axis 15. It is also conceivable in particular for end surface 23 also to have depressions or elevations, starting from a flat configuration, in certain regions.

Plane 39 is characterized in that an edge 42 of stop surface 18 of stop element 16 lies in it. In this example embodiment, edge 42 is embodied as an edge 42 in the shape of a circular line, a circular line segment of edge 42 being depicted in FIG. 2. Stop surface 18 is configured in accordance with enveloping surface 18 of a cone. Considering, for example, a surface line 43 that extends in enveloping surface 18 from edge 42 in a straight line to longitudinal axis 15, a non-negligible inclination angle 44 is then defined in that regard. That inclination angle 44 is obtained as the projection of surface line 43 parallel to longitudinal axis 15 into plane 39 is a radius 43'. Inclination angle 44 is then obtained from the right triangle having surface line 43 as the hypotenuse and having radius 43' as the adjacent side with regard to inclination angle 44.

In an example embodiment, the non-negligible inclination angle 44 can also vary along edge 42. In this example embodiment, however, inclination angle 44 is constant along edge 42, since stop surface 18 results from enveloping surface 18 of a cone.

Edge 42 is projected into projection plane 41 along longitudinal axis 15, i.e., parallel to longitudinal axis 15. This results in projection 42' of edge 42.

In this example embodiment, an opening 45 of passthrough conduit 30 is located in plane 40. In this example embodiment, opening 45 is configured as a circular opening 45. Opening 45 is thus delimited by a continuous line 46 that is embodied in this example embodiment as a circular line 46. Opening 45 and circular line 46 are projected along longitudinal axis 15 into projection plane 41. The result is to produce in projection plane 41 respectively a projection 45' of opening 45 and a projection 46' of circular line 46.

In accordance with the proposed solution, valve 1 is configured in such a way that projection 42' of edge 42 of stop surface 18 into projection plane 41, which is penetrated perpendicularly by longitudinal axis 15 and at which armature 6 and stop surface 18 are in contact during operation, extends into projection plane 41 through projection 45' of opening 45, facing toward stop surface 18, of passthrough conduit 30. As a result of projection 42' of edge 42 into projection plane 41, projection 45' of opening 45 into projection plane 41 becomes divided into an inner partial surface 50 and an outer partial surface 51.

A "projection" into projection plane 41 is to be understood to mean that the projection occurs perpendicularly into projection plane 41. Because projection plane 41 is penetrated perpendicularly by longitudinal axis 15, this means that the projections always occur along or parallel to longitudinal axis 15. It is also understood in this context, however, that tolerances, a desired clearance between armature 6 and valve needle 7, and similar tolerance- or design-related influences can result in deviations from an idealized design or projection upon concrete implementation of valve 1. Such influences, in particular because of a clearance between armature 6 and valve needle 7, can result, for example, in a family of curves for projection 46' of circular line 46 into projection plane 41, which encompasses circular lines radially offset somewhat with respect to longitudinal axis 15 around the idealized projection 46'. In the context of any rotationally symmetrical configuration of stop surface 18, relative rotations of armature 6 around longitudinal axis 15 with reference to stop element 16 can be regarded as equivalent. If necessary in a concrete individual instance, a guidance of armature 6 along valve needle 7 that limits or prevents such relative rotations of armature 6 can also optionally be implemented.

Figure 3:
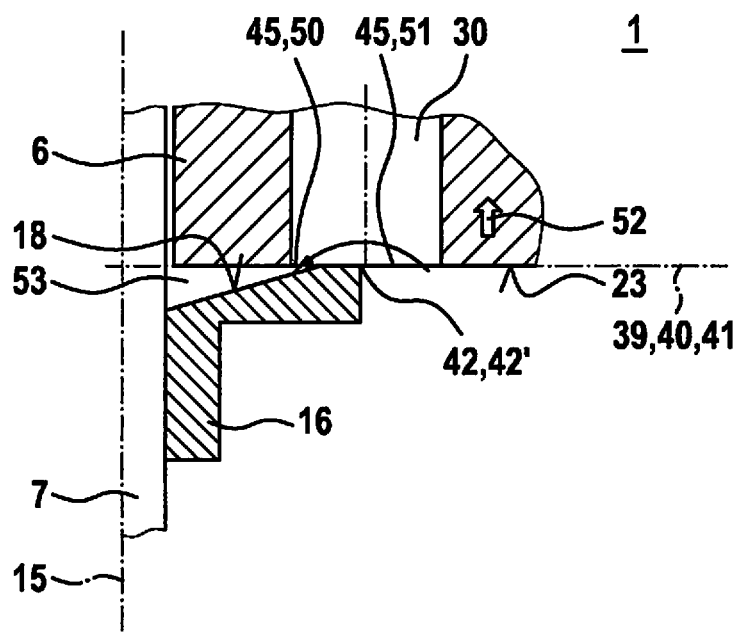
FIG. 3 shows a detail of the valve shown in FIG. 1 in the context of an actuation operation, at a first point in time, according to an example embodiment of the present invention.

FIG. 3 shows a detail of valve 1 shown in FIG. 1 in the context of an actuation operation, at a first point in time. The situation depicted here is one that occurs at the time at which an actuation of valve 1 begins, when current flow through solenoid 4 is just occurring. A magnetic force is exerted here on armature 6 in direction 52, which force accelerates armature 6, or moves it out of its initial position, in direction 52.

In the initial position, planes 39-41 illustrated in FIG. 2 coincide, since armature 6 and stop surface 18 are in contact.

As a result of the above-described configuration of stop surface 18, there is formed between stop surface 18 and end surface 23 of armature 6 an interstice that, in this example embodiment, is rotationally symmetrical with reference to longitudinal axis 15. Interstice 53 can be regarded as partial space 53 of interior space 11 of valve 1 which, in principle, communicates hydraulically with the remainder of interior space 11. Interstice 53 becomes larger as armature 6 moves in direction 52. This means that the pressure in interstice 53 tends to decrease. That decrease is then compensated for by an inflow of the liquid fluid from the remainder of the interior space. That means that a fluid exchange occurs from outside to inside by way of the internally located or inner partial surface 50, passthrough conduit 30 in the region of its opening 45 and the outer or externally located partial surface 51. This represents a bypass via passthrough conduit 30. This facilitates release of armature 6, just at the beginning of its motion in direction 52, from stop element 16. In the broader sense, hydraulic sticking is thereby avoided.

Figure 4:
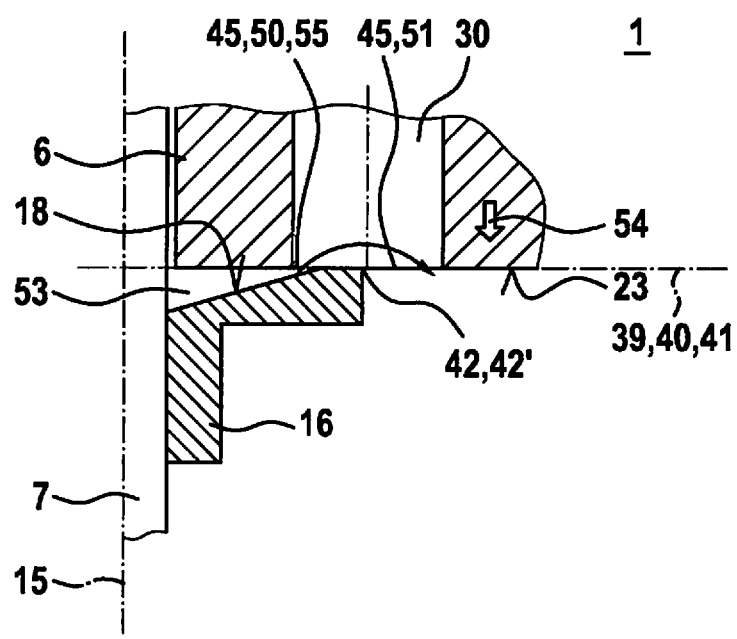
FIG. 4 shows the detail of the valve shown in FIG. 3 in the context of the actuation operation, at a second point in time, according to an example embodiment of the present invention.

FIG. 4 shows the detail of valve 1 shown in FIG. 3 in the context of the actuation operation, at a second point in time. This depicts a point in time at which armature 6 is being guided, upon closing of valve 1, toward stop element 16 in a direction 54. When armature 6 approaches stop element 16, the liquid fluid is forced out of interstice 53 and the pressure in interstice 53 tends to rise. The liquid fluid is thereby forced from inside to outside, out of interstice 53 through inner partial surface 50, passthrough conduit 30 in the region of its opening 45, and outer partial surface 51, into the remainder of inner space 11. In the context of this fluid exchange, at first a substantially unthrottled passage of fuel occurs in a region 55. This then also corresponds to the situation that is relevant to the actuation of valve 1, described on the basis of FIG. 3.

When considered dynamically, however, as valve 1 closes and as armature 6 strikes against stop element 16 in direction 54, an elastic deformation of stop element 16 also occurs, as described below with reference to FIGS. 5-7. Bouncing of armature 6 back against stop element 16 upon closing of valve 1 can thereby be reduced.

Figure 5:
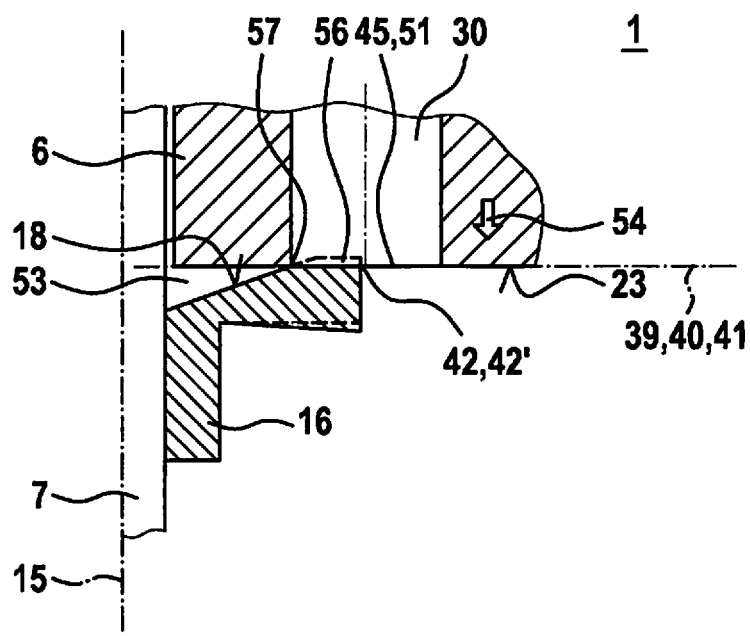
FIG. 5 shows the detail of the valve shown in FIG. 3 in the context of the actuation operation, at a third point in time, according to an example embodiment of the present invention.

FIG. 5 shows the detail of valve 1 shown in FIG. 3 in the context of the actuation operation, at a third point in time. A contour 56 of the undeformed stop element 16 is also schematically depicted here for explanatory purposes. As a result of the elastic deformation of stop element 16 with respect to contour 56, a further reduction in the opening cross section occurs in region 55 depicted in FIG. 4, so that a throttling point 57 forms between armature 6 and stop element 16. The fluid exchange from inside to outside, out of interstice 53 into the remainder of inner space 11, thereby becomes increasingly throttled. This correspondingly produces a pressure rise in interstice 53. This results in uncompensated hydraulic forces oppositely to direction 54, which act at end surface 23 on armature 6. Elastic forces or spring forces, which act oppositely to direction 54 on armature 6, guided on valve needle 7, due to the elastic deformation of stop element 16, also act. The overall result is a damped deceleration of armature 6 in direction 54 over a certain motion range of armature 6.

Valve 1 can also be refined in such a way that the further damping, described below with reference to FIG. 6, additionally occurs.

Figure 6:
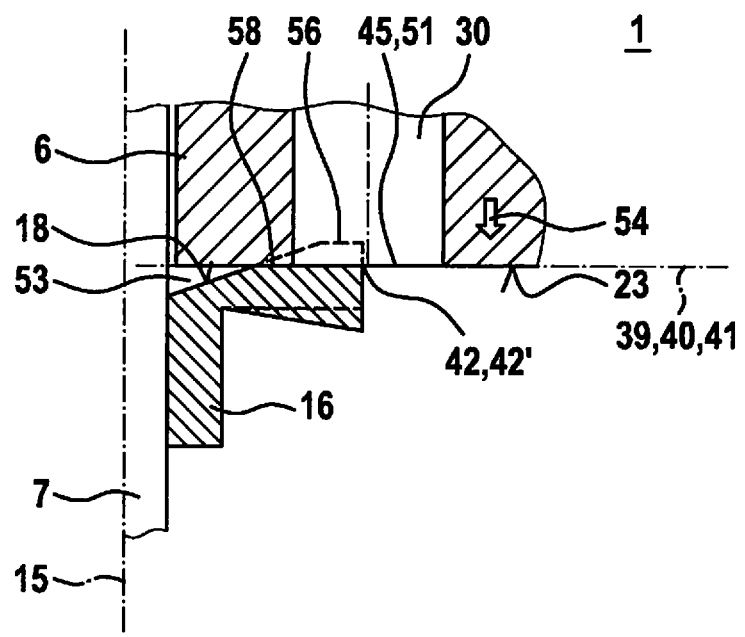
FIG. 6 shows the detail of the valve shown in FIG. 3 in the context of the actuation operation, at a fourth point in time, according to an example embodiment of the present invention.

FIG. 6 shows the detail of valve 1 shown in FIG. 3 in the context of the actuation operation, at a fourth point in time. With this possible embodiment, a further deformation of stop element 16 occurs in order to decelerate armature 6. Upon the deformation, depicted with respect to contour 56 of the undeformed stop element 16, throttling point 57 becomes to a certain degree completely closed, and a nip gap 58 is produced. Nip gap 58 results at least in a further intensification of the throttling of the fluid exchange out of interstice 53 into passthrough conduit 30 or into the remainder of inner space 11. This thus causes a further pressure rise in interstice 53 and therefore a corresponding uncompensated force on armature 6 oppositely to direction 54. Added to these is the spring force occurring due to the flexing of stop element 16. Valve 1 is preferably configured in such a way that interstice 53 does not completely disappear at any point in time, i.e., liquid fluid is present in interstice 53 when armature 6 comes to a halt relative to valve needle 7 and a reversal of the motion of armature 6 occurs in accordance with the dynamics of the deceleration process.

Figure 7:
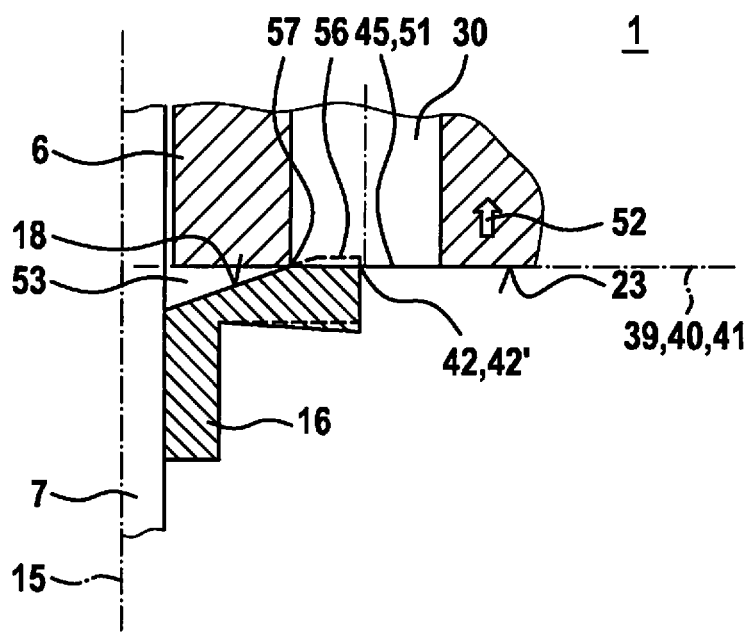
FIG. 7 shows the detail of the valve shown in FIG. 3 in the context of the actuation operation, at a fifth point in time, according to an example embodiment of the present invention.

FIG. 7 shows the detail of valve 1 shown in FIG. 3 in the context of the actuation operation, at a fifth point in time. After the reversal of the motion of armature 6 while valve 1 remains closed, as stop element 16 springs back into the relaxed position of stop element 16 illustrated by contour 56, an increase in the volume of interstice 53 is caused. This then results in a negative pressure in interstice 53 with respect to the pressure in the remainder of interior space 11. An uncompensated hydraulic force is thus produced on armature 6 oppositely to direction 52. Because the return of stop element 16 into its relaxed initial position causes a force on armature 6 in direction 52, the negative pressure in interstice 53 damps the motion of armature 6 after its reversal of motion. Bounce-back of armature 6 is thereby damped. In accordance with the relaxation of stop element 16, the result is again to create throttling point 57 through which a fluid exchange in interstice 53 is enabled.

The spring-back of armature 6 in direction 52 is thus decelerated by the negative pressure produced in interstice 53. Depending on the configuration of valve 1, further reverberations can optionally also occur. An advantageous damping is nevertheless produced, so that improved stabilization of armature 6 occurs. In particular, it is thereby possible to avoid or entirely prevent reopening of valve 1 due to a reverse impact of armature 6 and a complete traverse through armature travel distance 20. In addition, armature 6 can quickly be stabilized sufficiently such that, upon another actuation, armature travel distance 20 is at least largely available as an acceleration distance for armature 6, so that reliable opening of valve 1 can be achieved by way of a sufficiently large momentum of armature 6. This can therefore make possible, for example in the context of a desired multiple injection capability, a short off time between individual injections of an injection cycle.

Figure 8:
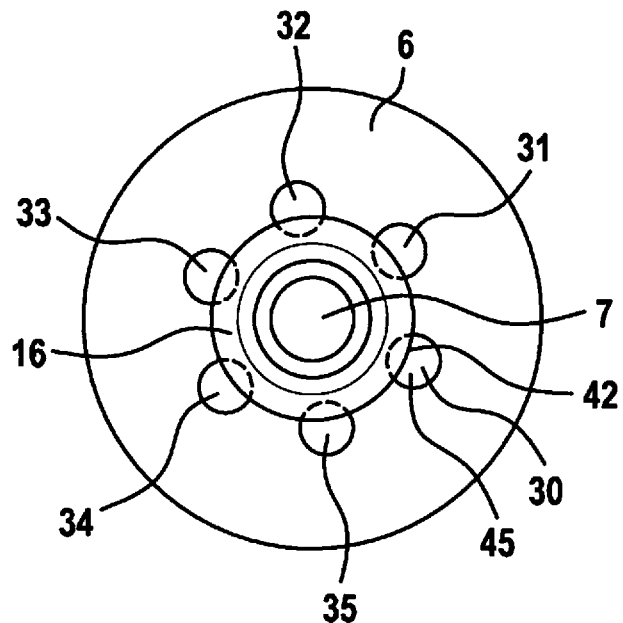
FIG. 8 schematically depicts an armature and a stop element disposed on a valve needle of the valve, from a viewpoint along a longitudinal axis of the valve needle, according to an example embodiment of the present invention.

FIG. 8 schematically depicts an armature 6 and a stop element 16 disposed on a valve needle 7 of valve 1, along longitudinal axis 15 of valve needle 7, in accordance with a possible example embodiment. In this embodiment, passthrough conduits 30-35 are configured as cylindrical passthrough orifices 30-35. Passthrough orifices 30-35 are disposed with a uniform circumferential distribution. All the passthrough orifices 30-35 are furthermore embodied on armature 6 at the same radial spacing with respect to longitudinal axis 15. With this embodiment, relative rotations of armature 6 with reference to stop element 16 connected to valve needle 7 have no influence in terms of the manner of operation that is described.

Figure 9:
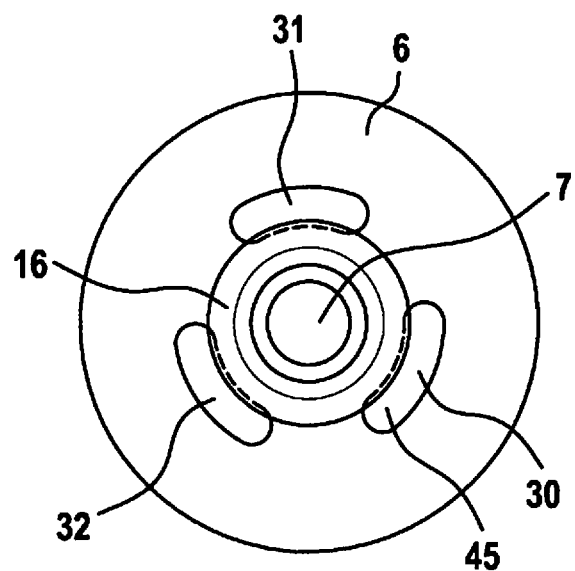
FIG. 9 is the schematic depiction shown in FIG. 8 of the armature and of the stop element disposed on the valve needle, according to an example embodiment of the present invention.

FIG. 9 is the schematic depiction shown in FIG. 8 of armature 6 and of stop element 16 disposed on valve needle 7, in accordance with another example embodiment. In this embodiment, openings 45 of passthrough conduits 30, 31, 32 are configured in a kidney shape. To simplify the depiction, only opening 45 is labeled. The configuration of passthrough conduit 30 can also be described as being based on an elongated hole for which a drill bit or milling cutter is moved on a specific radius along a circular line segment, or in accordance with an elongated hole that is made up of orifices which are disposed on a specific radius with respect to longitudinal axis 15 and whose disposition extends continuously over a circular line segment on that radius. Passthrough conduits 31, 32 can be described correspondingly.

The configuration described with reference to FIG. 9 also has the advantage that rotations of armature 6 relative to stop element 16 have no influence on the manner of operation that is described.

Figure 10:
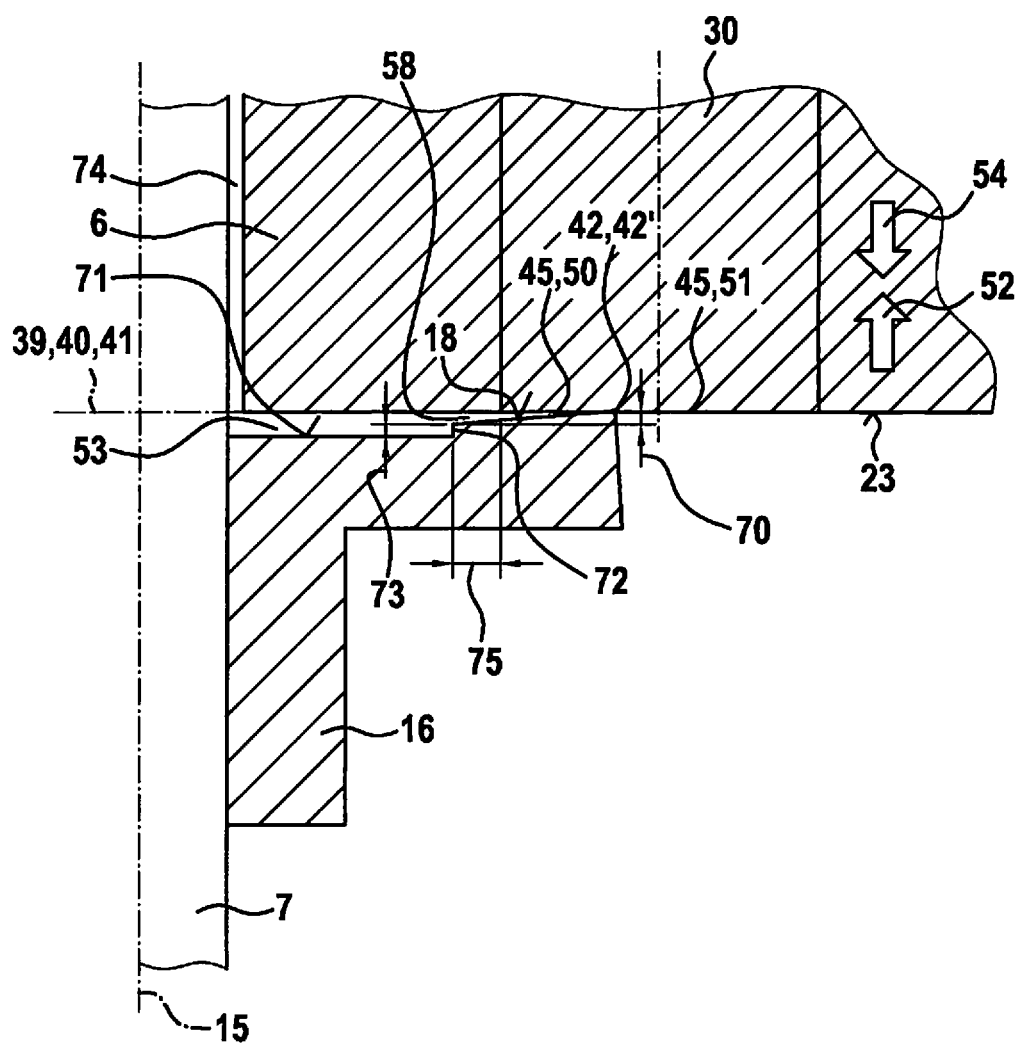
FIG. 10 shows the detail of the valve shown in FIG. 3, according to an example embodiment of the present invention.

FIG. 10 shows the detail of valve 1 shown in FIG. 3, in accordance with a further example embodiment. In this example embodiment, end surface 23 of armature 6 is located in projection plane 41 when armature 6 and stop surface 18 are in contact at projection plane 41 during operation. The contact occurs here at edge 42 of stop element 16. Stop surface 18 is configured in accordance with enveloping surface 18 of a truncated cone. Viewed in profile, the result is to define a slight conicity that is characterized by a height 70, viewed along longitudinal axis 15, of stop surface 18.

Also embodied on stop element 16 is a surface 71, embodied in this example embodiment as an annular surface 71, that delimits interstice 53. In this example embodiment, a step 72 having a height 73 viewed along longitudinal axis 15 is provided between annular surface 71 and stop surface 18. Step 72 can have, for example, a height 73 of approximately 0.02 mm.

By way of height 73 of step 72, it is possible to predefine the volume of interstice 53 that exists in the initial state when armature 6 is in contact with stop element 16. Upon an actuation of armature 6 in direction 52, a fluid exchange via opening 45 out of interior space 11 through passthrough conduits 30-35 into interstice 53 is enabled, in which context the volume of interstice 53 increases to a certain extent and a sticking effect just at the beginning of the motion of armature 6 is avoided.

Upon impact of armature 6 against stop element 16, which occurs upon closing oppositely to direction 52, i.e., in direction 54, an elastic deformation of stop element 16 occurs and a nip gap 58 forms between stop surface 18 of stop element 16 and end surface 23 of armature 6. An increase in the pressure of the fluid in interstice 53 occurs. Due to the deformation of stop element 16, a further reduction in the volume of interstice 53 then occurs as long as armature 6 is moving oppositely to direction 52. The fluid is then pushed out of interstice 53 through nip gap 58. Fluid can furthermore also be pushed out of interstice 53 via a guidance gap 74 between armature 6 and valve needle 7. The high pressure in interstice 53 produces a decelerating force on armature 6 in direction 52.

The reversal of the direction of armature 6 then occurs, in which armature 6 shifts from motion direction 54 into motion direction 52 while stop element 16 becomes elastically deformed. The motion of armature 6 in direction 52 causes an increase in the volume of interstice 53 and thus a collapse of the pressure in interstice 53. While the overpressure in interstice 53 in the context of the motion oppositely to direction 52 causes a decelerating force, no further relevant accelerating force now occurs. This means that a direction-dependent decelerating effect is achieved. Rapid stabilization of armature 6 is thereby enabled.

With this embodiment, coordination of the hydraulic behavior can be accomplished by way of a radial minimum length 75 of nip gap 58. Depending on the configuration of valve 1, it is possible to influence by way of radial minimum length 75, for example, the pressure that is produced in interstice 53 as armature 6 impacts and as stop element 16 flexes. In particular, the maximum achievable overpressure can be adjusted.

Figure 11:
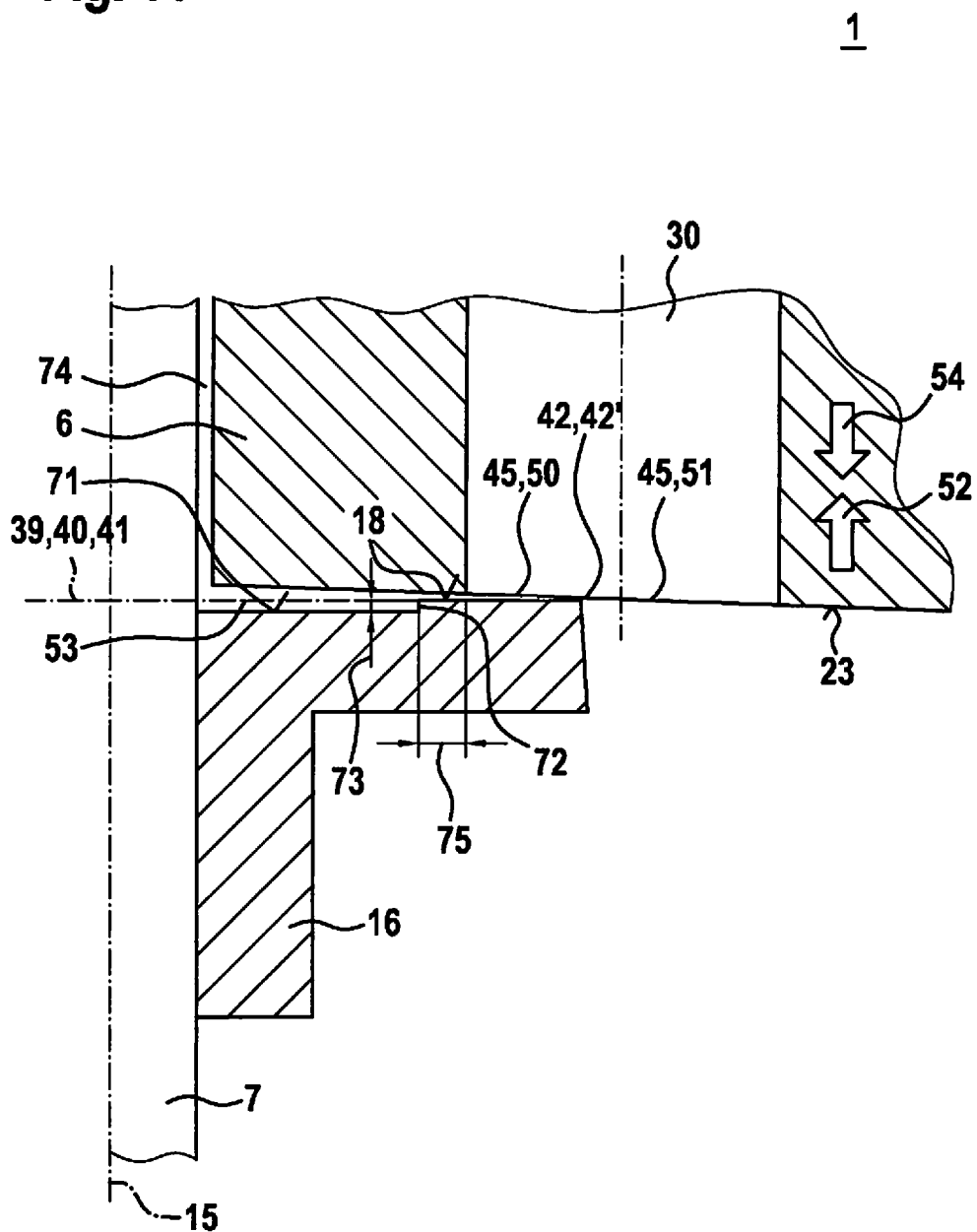
FIG. 11 shows the detail of the valve shown in FIG. 3, according to an example embodiment of the present invention.

FIG. 11 shows the detail of valve 1 shown in FIG. 3, in accordance with a further example embodiment. In this example embodiment, stop surface 18 is located in projection plane 41 when armature 6 and stop element 16 are in contact at projection plane 41. In particular, in this example embodiment, stop surface 18 and annular surface 71 are oriented parallel to each other, step 72, having height 73, being provided between them. Height 70, as depicted in FIG. 10, is omitted or is predefined here as a target variable equal to zero. A certain tolerance range can nevertheless be defined in terms of manufacturing engineering so that, for example, in the context of series production, there can also be samples in which the conicity of stop surface 18, viewed in profile, drops off oppositely to the situation illustrated in FIG. 10. Contact nevertheless occurs at edge 42, this being achieved by the physical configuration of end surface 23 of armature 6.

In this example embodiment, end surface 23 of armature is configured in accordance with an enveloping surface 23 of a cone. End surface 23 is embodied here in such a way that proceeding from the degenerate case of an opening angle of 180°, a sufficiently reduced opening angle that is nevertheless still equal to almost 180° is defined for the relevant cone, in order to place the contact point or the segmented contact line at edge 42.

Combinations of the example embodiments presented are also conceivable. For example, a combination of stop element 16 depicted in FIG. 10 with an armature 6 depicted in FIG. 11 is also possible. Further, the angles and distances are depicted in the figures are schematic, and in some cases also with considerable exaggeration. For example, a conicity of stop surface 18 is depicted in profile with considerable exaggeration with respect to a configuration preferred in practice. Additionally, the invention is not limited to the example embodiments described.

What is claimed is:

1. A valve for metering a fluid, the valve comprising:
   an electromagnetic actuator that includes an armature, wherein the armature includes at least one passthrough conduit;
   a valve closing body;
   a valve seat surface with which the valve closing body interacts to form a sealing seat;
   a valve needle that is actuatable by the electromagnetic actuator to actuate the valve closing body and on which the armature of the electromagnetic actuator is guidable to move along a longitudinal axis of the valve needle; and
   at least one stop surface disposed on the valve needle, limiting the movement of the armature, and including an edge that is arranged to:
      at least temporarily during operation, meet, at an inner part of an opening of the at least one passthrough conduit, a projection plane that is perpendicular to the longitudinal axis and is at a bottom of the armature, with an outer part of the opening being radially exterior to the edge, thereby enabling a fluid exchange between (a) inside an area that is on the at least one stop surface and below the armature and (b) outside of the area via a path that extends from the area to the inner part of the opening to the outer part of the opening; and
      at least temporarily during the operation, project beyond the projection plane into the opening of the at least one passthrough conduit.

2. The valve of claim 1, wherein the valve is a fuel injection valve of an internal combustion engine.

3. The valve of claim 1, wherein the edge of the at least one stop surface is an outer edge of the at least one stop surface.

4. The valve of claim 1, wherein the at least one stop surface is configured as a continuous or broken enveloping surface of a body that tapers along the longitudinal axis.

5. The valve of claim 4, wherein the body that tapers along the longitudinal axis is shaped as a cone or truncated cone.

6. The valve of claim 1, wherein, when the armature and the at least one stop surface are in contact and the at least one stop surface is in a stress-free state, only the edge of the at least one stop surface abuts against the armature.

7. The valve of claim 1, wherein:
   the at least one stop surface is part of a stop element connected to or configured on the valve needle; and
   the stop element is arranged such that, during operation, as a result of a dynamic deformation of the stop element that is enabled by stoppage of the armature against the at least one stop surface, the at least one stop surface, along with an edge region adjoining at the edge of the at least one stop surface, temporarily at least partly blocks fluid exchange through the inner part of the opening.

8. The valve of claim 7, wherein the stop element is embodied in such a way that during operation, a portion of the area always remains between the stop element and a bottom surface of the armature.

9. The valve of claim 7, wherein the stop element and a bottom surface of the armature are arranged such that, during operation, at least a portion of the area, which adjoins the valve needle, always remains between the stop element and the bottom surface of the armature.

10. The valve of claim 9, wherein a surface delimiting the area and that is perpendicular to the longitudinal axis is configured on the stop element, and a step separates the surface from the at least one stop surface.

11. The valve of claim 7, wherein the stop element and a bottom surface of the armature are arranged such that, during operation, at least a portion of the area, which is arranged at least approximately rotationally symmetrically around the longitudinal axis of the valve needle, always remains between the stop element and the bottom surface of the armature.

12. The valve of claim 11, wherein a surface delimiting the area and that is perpendicular to the longitudinal axis is configured on the stop element, and a step separates the surface from the at least one stop surface.

13. The valve of claim 1, wherein an end surface of the armature that faces towards the at least one stop surface lies in the projection plane when the armature and the at least one stop surface are in contact at the projection plane during operation; and/or the at least one stop surface lies in the projection plane when the armature and the at least one stop surface are in contact at the projection plane during operation.

14. The valve of claim 1, wherein the at least one stop surface lies in the projection plane when the armature and the at least one stop surface are in contact at the projection plane during operation.

15. The valve of claim 1, wherein the at least one stop surface and the at least one passthrough conduit are arranged such that the inner part of the opening is not larger than the outer part of the opening.

* * * * *